Figure 1:
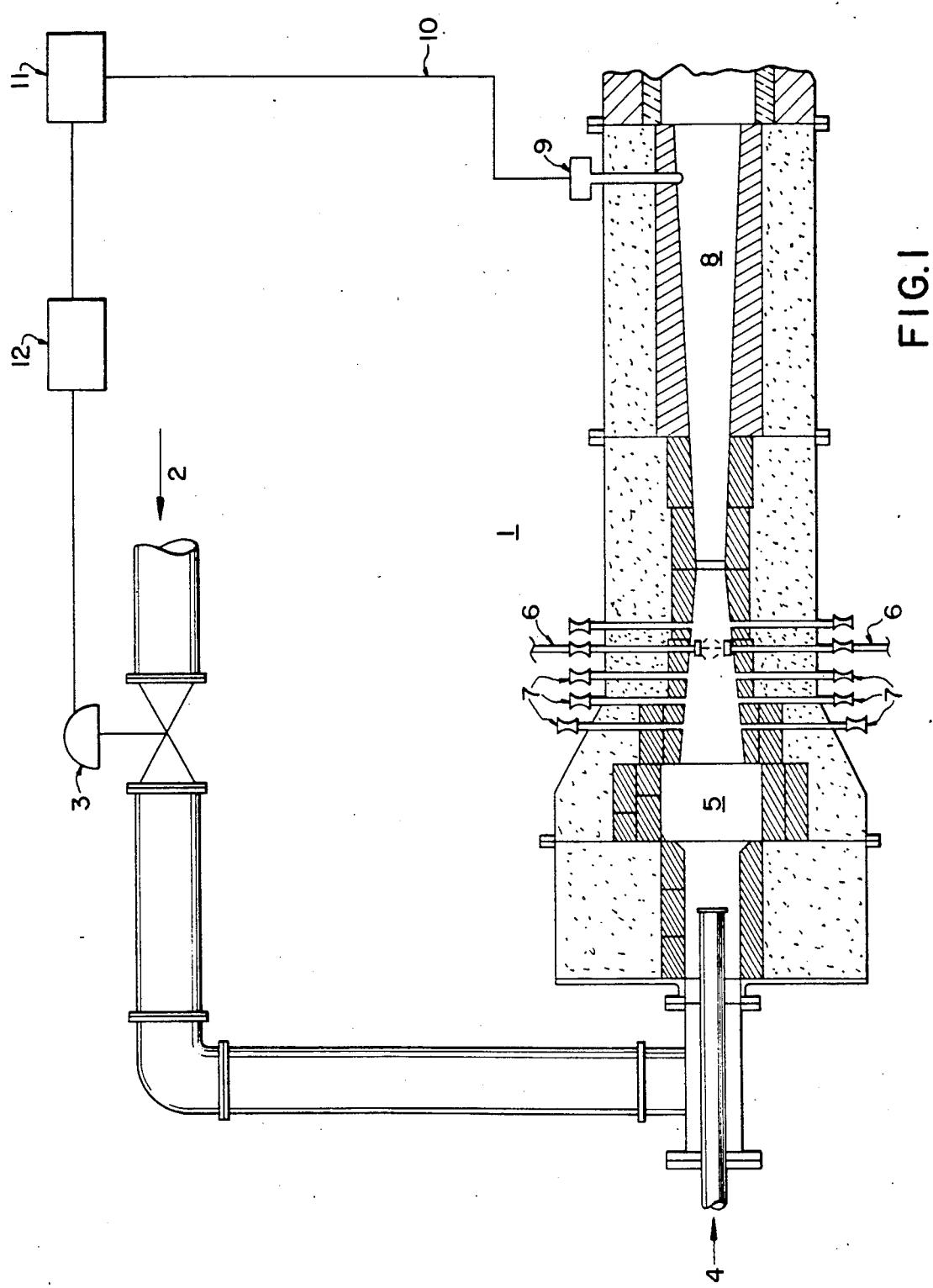

United States Patent [19]

Howell

[11] Patent Number: 5,049,369

[45] Date of Patent: Sep. 17, 1991

[54] CONTROL OF A CARBON BLACK REACTOR

[75] Inventor: Ronald L. Howell, Big Spring, Tex.

[73] Assignee: Sid Richardson Carbon & Gasoline Co., Fort Worth, Tex.

[21] Appl. No.: 439,621

[22] Filed: Nov. 20, 1989

[51] Int. Cl.⁵ .......................... C01B 31/02; C09C 1/48
[52] U.S. Cl. ...................................... 423/450; 423/449
[58] Field of Search ................................. 423/450, 449

[56] References Cited

U.S. PATENT DOCUMENTS

| | | | |
|---|---|---|---|
| 3,523,010 | 8/1970 | Horn et al. | 423/449 |
| 3,993,447 | 11/1976 | Buss et al. | 423/450 |
| 4,080,434 | 3/1978 | Buss et al. | 423/450 |
| 4,206,192 | 6/1980 | Austin | 423/455 |
| 4,302,423 | 11/1981 | Cheng et al. | 423/450 |
| 4,341,750 | 7/1982 | Vanderveen | 423/449 |
| 4,588,557 | 5/1986 | Henderson | 423/450 |

FOREIGN PATENT DOCUMENTS 1426989  9/1988  U.S.S.R. .............. 423/449

Primary Examiner—Gregory A. Heller

[57] ABSTRACT

A method and apparatus for controlling in a continuous fashion the surface area of carbon black being produced in the carbon black formation zone of a carbon black reactor. Specifically, this invention is a method and apparatus for maintaining uniform surface area of a particular grade of carbon black while it is being produced continuously by an oil furnace process. The process parameters, such as rate flow of an oxidation material, of a combustion material, and of a hydrocarbon feedstock material as well as the quality (composition) and temperature of each of these materials may be altered based upon the temperature of the flowing mass as measured in the reaction zone of a carbon black reactor. The temperature measured within the reaction zone then can be used as an indicator of the particle size of the carbon black since an adjustment to rate of flow, quantity, and temperature of each material affects the end product.

8 Claims, 1 Drawing Sheet

CONTROL OF A CARBON BLACK REACTOR

FIELD OF THE INVENTION

This invention relates to a method and apparatus for controlling in a continuous fashion the surface area of carbon black being produced in the carbon black formation zone of a carbon black reactor. Specifically, this invention is a method and apparatus for maintaining uniform surface area of a particular grade of carbon black while it is being produced continuously by an oil furnace process.

BACKGROUND OF THE INVENTION

A carbon black reactor comprises three zones. The first zone is a combustion zone in which air and fuel are burned to produce highly heated gases which travel to a second zone, the reaction zone. In the second zone, a hydrocarbon feedstock such as oil is injected into the highly heated gases and, thus, is partially burned and partially "cracked" to produce carbon black. The highly heated gases with the carbon black entrained therein is passed to the third zone, the quenching zone. In the third zone, the gases and carbon black are quenched with water and then passed to filtering equipment for separation of the carbon black from waste gases and from water vapor.

The carbon black produced by this process is used in a variety of ways. For example, approximately ninety percent of the carbon black produced is utilized in the production of automobile tires, approximately six to seven percent is utilized in rubber moldings and similar products, and the remainder is used primarily in pigments and in inks.

A fine particle size carbon black generally is desirable since such particles have an extremely high surface area which may range from five square meters per gram of carbon black to two hundred fifty square meters per gram of carbon black.

Several methods exist for measuring the surface area of the carbon black. One of the most frequently used methods is the iodine adsorption test in which the amount of iodine adsorped by the carbon black is measured. In this test, the more iodine absorbed, the greater the surface area. This test generally can be successfully completed and results obtained within fifteen minutes. Another test similar to the iodine adsorption test is the nitrogen adsorption test, but it generally requires at least one hour to obtain results.

These tests, and specifically, the iodine adsorption test, are run during production to measure the surface area of the carbon black being produced. Since the iodine adsorption test is capable of being run much more quickly, it is the preferred test because it allows the production process to be readily adjusted so as to produce carbon black within certain parameters, for example, such as a given particle size. The size of carbon black is very important because it may dictate certain performance characteristics of products in which it is used. Discrete particles in each grade of carbon black vary in size when measured by microscopic or adsorption means. Accordingly, the particle size is expressed as an average size of the particles measured. Iodine adsorption tests, such as ASTM D 1510-88B are needed to determine whether the proper size of carbon black is being produced. Producers of carbon black are paying increased attention to particle size control because more buyers of carbon black are requiring a product which is more uniform in size. In some instances, the product must not vary more than plus or minus three iodine adsorption units rather than five or ten, as in the past. Thus, the control of the process by which carbon black is made has become very important.

In U.S. Pat. No. 3,993,447, Buss et al. disclose an apparatus and method for the production of carbon black wherein the uniformity of the carbon black is maintained by regulating the flow of fuel to the combustion zone in response to a signal representative of the combustion zone temperature. The flow of fuel to the combustion zone can be regulated in response to a signal representative of the rate of combustion heat released by the fuel entering the combustion zone. U.S. Pat. No. 4,080,434 to Buss et al. is a division of an earlier filed application which matured into U.S. Pat. No. 3,993,447.

In U.S. Pat. No. 4,206,192, Austin discloses a method for the production of carbon black in a carbon black reactor having at least one combustion zone opening into a reaction zone. Austin controls the quench fluid flow rate into the combustion zone in order to control the temperature of the combustion gases. This temperature control is desired in order to protect the refractory lining of the combustion zone. U.S. Pat. No. 4,315,894 to Austin is a division of an earlier filed application which matured into U.S. Pat. No. 4,206,192.

In U.S. Pat. No. 4,302,423, Cheng et al. disclose an apparatus and method for producing carbon black in a carbon black reactor. Cheng et al. utilize a control means to produce a signal representative of the rate of heat transfer in the indirect heat exchange means such that when the heat transfer rate falls below a predetermined level, the control means closes a valve in the feed hydrocarbon input line to terminate flow of feed hydrocarbon to the reactor. Cheng et al. provide a method for producing carbon black which can be operated substantially continuously without the need of completely terminating operation for cleaning of an indirect heat exchanger to maintain the heat exchange rate in a desired range, that is, to minimize carbon black buildup in an indirect heat exchanger.

SUMMARY OF THE PRESENT INVENTION

Constant combustion zone temperature will not necessarily produce a carbon black having a substantially uniform particle size. For example, feedstock oil flow rate, temperature and oil quality also effect the particle size (i.e., the surface area) of the carbon black as it is produced in the reactor. Of particular importance is the temperature within the reaction zone where carbon black is formed. This temperature is kept uniform through control of certain input streams or process parameters, such as rate of flow of fuel gas, rate flow of feedstock oil, temperature and quality of the fuel gas, temperature and quality of feedstock oil, temperature and quality of air, and, preferably, the flow rate of combustion air. These process parameters are adjusted in response to signals generated by at least one temperature detection means such as a thermocouple or optical pyrometer located in the carbon black formation zone between the point where carbon black oil is injected into the reactor and the point where water is injected to quench the carbon forming reaction. The temperature detection means measures the flowing mass temperature and sends a signal to a controller which processes the signal and then selectively sends a second signal, as needed, to a control valve located on one of the aforementioned input streams to the reactor. Any input stream or combination of input streams can be modulated in order to produce a desired uniform surface area of the carbon black being produced.

The surface area or uniformity of the carbon black is directly proportional to the reaction zone mass temperature. Likewise, the reaction zone mass temperature is directly related to the iodine adsorption as well as the nitrogen surface area which, in turn, is a predictor of carbon black particle size. By actually measuring and utilizing the reaction zone temperature (rather than by predicting the combustion zone temperature), selected process parameters can be adjusted to yield a carbon black product varying ±5 g/Kg or less as measured using the iodine adsorption test, and ±5 m²/g or less as measured using the nitrogen adsorption or nitrogen surface area test. Thus, a more closely controlled and more uniform product is produced.

One object of this invention is to provide a means and method for providing a uniform carbon black reaction product by maintaining a substantially constant temperature in the carbon black formation zone, specifically in the reaction zone of a carbon black reactor.

Another object of this invention is to place a temperature measurement means, such as a thermocouple or an optical pyrometer target tube in the carbon black reaction zone to read the temperature within that zone, and to utilize those readings to selectively adjust the various input streams to the reactor to maintain a selected reaction zone temperature thereby producing a uniform carbon black product size.

Another object of this invention, is to utilize a single measured variable from the reaction process, i.e., the temperature in the reaction zone, to control the carbon black reactor.

A further object of this invention is to produce a carbon black product of uniform size and to produce a carbon black product having a typical specification width for iodine adsorption of ±5 g/Kg and as low as ±3 g/Kg when necessary.

DESCRIPTION OF THE DRAWING FIGURE

FIG. 1 is a partial cross-sectional view of an apparatus used for producing carbon black.

PREFERRED EMBODIMENT

Reference numeral 1 designates generally a carbon black producing apparatus (reactor) which includes a combustion zone 5, a venturi reaction zone 8, and a quench zone (not shown). The reactor 1 can be of any suitable type having a reaction chamber or zone 8 therein in which the pyrolysis to carbon black particles of hydrocarbon feedstock introduced via inlet means 6 is accomplished. A refractory lining is provided about the combustion and reaction zones. Oxidizing fluid 2, generally air, is introduced via flow control valve 3 to combustion zone 5. Fuel flows into combustion zone 5 via fuel inlet means 4 and mixes with the oxidizing fluid 2 to produce hot combustion gases which flow into the venturi reaction zone 8. A carbon black feedstock hydrocarbon is injected into the hot gases, which are at a temperature sufficiently high to pyrolyze the feedstock and form carbon black particles. As the entrained carbon black particles flow through and out of the reaction zone 8, a temperature measurement device 9, such as a thermocouple or an optical pyrometer, is used to measure the actual mass temperature within the reaction zone 8. The hot gases and entrained carbon black particles are then quenched. The carbon black particles are then filtered and collected for further treatment. The hot combustion gases, if desired, may be utilized for heat exchange, returned to the reactor, or otherwise used in the process.

The signal produced by the temperature measuring device 9 is sent via line or conduit 10 to transmitter 11 which converts the signal to a second signal which is proportional to the measured reaction zone temperature and which is compatible with and useable by a selected control device such as control device 12. The controller 12, for example, may be an electronic controller or a pneumatic controller. In any event, controller 12 compares the signal representative of the measured reaction zone temperature with a predetermined setpoint. It then sends a corrective signal to a control valve as needed to maintain a constant reaction zone temperature. One example of a control valve would be flow control valve 3 which controls the rate of flow of the oxidizing fluid.

The carbon black reactor utilizes four input materials: an oxidation material such as air, a combustion fuel such as oil or gas, a hydrocarbon feedstock material such as oil, and a quenchant such as water. Of these materials, the rate of flow of the oxidation material, combustion material, and feedstock material can be altered; likewise, the quality (composition) and temperature of each of these materials can be adjusted to produce a change in reaction zone temperature and ultimately a change affecting the uniformity of the size of carbon black particles produced.

The following chart shows how the combustion zone temperature (CZT) and reaction zone temperature (RZT) will be affected by a change in input of each material to the process. Also, the chart shows that iodine adsorption (I₂ and thus, the size of the carbon black particles) follows exactly the change in a reaction zone temperature (RZT), but not necessarily the change in combustion zone temperature (CZT).

| Material | CZT | RZT | $I_2$ |
| --- | --- | --- | --- |
| Oxidizer/Air | | | |
| Rate | + | − | + |
| Temperature | + | + | + |
| Composition (H₂O) | + | − | − |
| Fuel/Gas | | | |
| Rate | + | + | − |
| Temperature | + | + | + |
| Composition (BTU) | + | + | − |
| Feedstock Oil | | | |
| Rate | + | N/A | − |
| Temperature | + | N/A | + |
| Composition | + | N/A | + |

+ = increase; − = decrease.

Accordingly, based upon results displayed in the foregoing table the iodine adsorption (e.g., the surface area and consequently, the fineness of the carbon black particles) can be controlled through measurement of the reaction zone temperature which temperature is used to control selected inputs of certain materials, specifically, the oxidizer or air and the fuel or gas which combine to form the combustion gas used to reduce the feedstock to carbon black. By measuring the reaction zone temperature rather than the combustion zone temperature, a wider selection of input streams may be manipulated. Specifically, the oxidizer (air) may be manipulated to achieve a direct correlation with iodine adsorption and, thus, can be used to obtain a substantially uniform carbon black of a particular size.

I claim:

1. A method of continuously producing carbon black in a carbon black furnace having a combustion zone and a reaction zone, said method comprising:
   introducing an oxygen-reactive fuel and an oxygen-containing gas into said combustion zone, said fuel and oxygen containing gas being combined in the combustion zone as an ignitable mixture;
   burning said mixture in said combustion zone to form hot combustion gases that are conveyed downstream into said reaction zone of said furnace;
   introducing a hydrocarbon feedstock into said hot combustion gases in said reaction zone and thermally decomposing said feedstock therein, to form an aerosol of carbon black suspended within, the hot gases of combustion and thermal decomposition;
   measuring the temperature within the reaction zone during formation of said carbon black;
   selectively controlling introduction of one of said fuel, said oxygen-containing gas, and said feedstock into said reactor in response to said measured reaction zone temperature to establish and maintain a preselected setpoint temperature and thereby produce a carbon black having a preselected uniform surface area determined by said setpoint reaction zone temperature;
   conveying the carbon black aerosol downstream into a quench zone wherein the aerosol is quenched following decomposition of said feedstock; and
   separating and recovering said carbon black from the gases of said aerosol.

2. The method of claim 1 further comprising sending a signal representing said measured temperature to flow control means for at least one of said fuel, said oxygen-containing gas, and said hydrocarbon feedstock.

3. The method of claim 2 further comprising sending said signal to a transmitter which transmits said signal to a selected controller;
   said selected controller then comparing said signal representing said measured reaction zone temperature with a predetermined setpoint;
   determining a corrective signal based upon such comparison; and
   then sending said corrective signal to said flow control means to cause alteration of flow in a way that maintains a substantially constant reaction zone temperature.

4. The method of claim 2 wherein said monitoring of said temperature in said reaction zone is accomplished by utilizing a thermocouple.

5. The method of claim 1 wherein said monitoring of said temperature in said reaction zone is accomplished by utilizing an optical pyrometer.

6. The method of claim 1 further comprising controlling said reaction zone temperature and producing said carbon black with a variation in iodine adsorption within a range of ±5 g/Kg.

7. The method of claim 6 further comprising controlling said reaction zone temperature and producing said carbon black with a variation in iodine adsorption within a range of ±3 g/Kg.

8. In a continuous oil furnace process for producing carbon black wherein a fuel and an oxidant are introduced into a combustion zone of a furnace to form a mixture that is burned to produce hot combustion gases and a feedstock hydrocarbon is mixed with said hot combustion gases and is at least partially decomposed within a reaction zone of the furnace to produce an aerosol of carbon black in hot gases, said aerosol is subsequently cooled in a quenching zone downstream of the reaction zone of the furnace, and the carbon black is then separated from the gases and recovered, the method for producing carbon black having a uniform surface area which comprises:
   selecting a predetermined setpoint reaction temperature for the reaction mass which flows continuously through said reaction zone,
   continuously monitoring within said reaction zone the temperature of said flowing reaction mass and determining a measured temperature of said mass,
   comparing said measured temperature with said setpoint temperature,
   maintaining said setpoint temperature by selectively controlling the introduction of at least one of said fuel, said oxidant, and said feedstock hydrocarbon in response to deviation from said setpoint temperature as determined by said comparing of setpoint and measured temperature, and
   continuously recovering furnace carbon black having a surface area controlled by response to deviations in flowing reaction mass temperature from said setpoint temperature.

* * * * *